April 24, 1951     R. S. CRENSHAW, JR     2,549,779
ELECTRONIC COUNTER CIRCUIT

Filed Dec. 9, 1949     2 Sheets-Sheet 1

INVENTOR
RUSSELL SYDNOR CRENSHAW, JR.
BY M. Q. Hayes
ATTORNEY

April 24, 1951  R. S. CRENSHAW, JR  2,549,779
ELECTRONIC COUNTER CIRCUIT

Filed Dec. 9, 1949  2 Sheets-Sheet 2

INVENTOR
RUSSELL SYDNOR CRENSHAW, JR.

BY M. C. Hayes
ATTORNEY

Patented Apr. 24, 1951

2,549,779

UNITED STATES PATENT OFFICE 2,549,779

ELECTRONIC COUNTER CIRCUIT

Russell Sydnor Crenshaw, Jr., United States Navy, Virginia Beach, Va.

Application December 9, 1949, Serial No. 132,181

18 Claims. (Cl. 315—323)

(Granted under the act of March 3, 1883, as amended April 30, 1928; 370 O. G. 757)

This invention relates to electron tube counting circuits and more particularly relates to a cold cathode gaseous diode electron tube counting ring responsive step by step to each of a plurality of potential pulses.

There are many methods of counting. Mechanical counters are generally unsatisfactory for high counting rates but often are used after electronic counters or dividing circuits have reduced the rate. Generally electronic counter circuits are either the sequence operated type or the energy storage type. Both types automatically recycle after the given number of input pulses and both types produce an output pulse by the resulting action. This invention relates to the type of sequence operated circuits which are in the form of a ring composed of a number of identical units each of which possesses two stable states of operation designated as "on" and "off." The pulses to be counted are applied simultaneously to all units and the units are so interconnected that a pulse will turn a unit "on" only if the unit immediately preceding it is "on" at the time the pulse is applied. The interrelation of units provides that only one unit can be "on" at a time, and, moreover, the unit "on" at the time the pulse is applied is placed in the "off" state. Usually some means are provided to indicate the "on" unit and to insure that the "zero" unit is "on" at the beginning of the counting interval. If desired, an output pulse is obtained for a counter of $n$ units at the $n$th pulse by taking an output when the $n-1$ unit goes from "on" to "off."

There are a number of well known circuits which have the properties required for the units of a counting ring. Often such circuits are critical not only with respect to tube characteristics and circuit constants, but also in regard to requiring input pulses of controlled amplitude and wave form. Further, such circuits are complex, needing large numbers of grid controlled vacuum tubes or grid controlled gaseous discharge tubes in addition to the glow discharge diodes used for indicators. In many of the circuits difficult problems, such as sensitizing the next unit in the ring in sequence, the limitation of gain in the individual elements, and the accuracy required of components, contribute to make such ring circuits with higher than three units tend to be unstable.

The principal object of the present invention is to provide an electronic counting system which is not only smaller, simpler, and less expensive than previous electronic counting systems but adaptable to any type and range of counting.

With this object in view, the present invention contemplates the use of cold cathode glow discharge tubes as the primary tubes in the counter circuit. It is well known that a glow discharge tube does not begin to conduct appreciable current until a critical potential known as the "breakdown" potential is exceeded. If there is a current limiting resistance in the circuit, the glow discharge takes place at a substantially lower potential across the tube which will be called the "running voltage." The difference between these two potentials is substantial but it varies with many factors in the construction of the tube although it is practically constant for a given tube type. Also a glow discharge tube will extinguish when the voltage across it drops below the "extinction voltage." This characteristic provides the glow discharge tube with the two necessary stable states of operatoin, "off" and "on," so that it can be incorporated into a circuit to serve as individual units of a sequence type counting ring.

Another object of the invention is to provide an electronic counting ring for counting electric pulses wherein the ring elements have cold cathode glow discharge diode electron tubes which are rendered conducting one at a time in sequence to each of commonly received potential pulses.

Another object of the invention is to provide an electronic counting ring for counting electric pulses which shall be able to provide higher counting rates than mechanical type counters with low power requirements and reliable operation.

To accomplish the foregoing general objects and other more specific objects which will hereinafter appear, the invention resides in the circuit elements and their relation one to another as are hereinafter described in the following specification. The specification is accomplished by the drawings in which.

Figure 1:
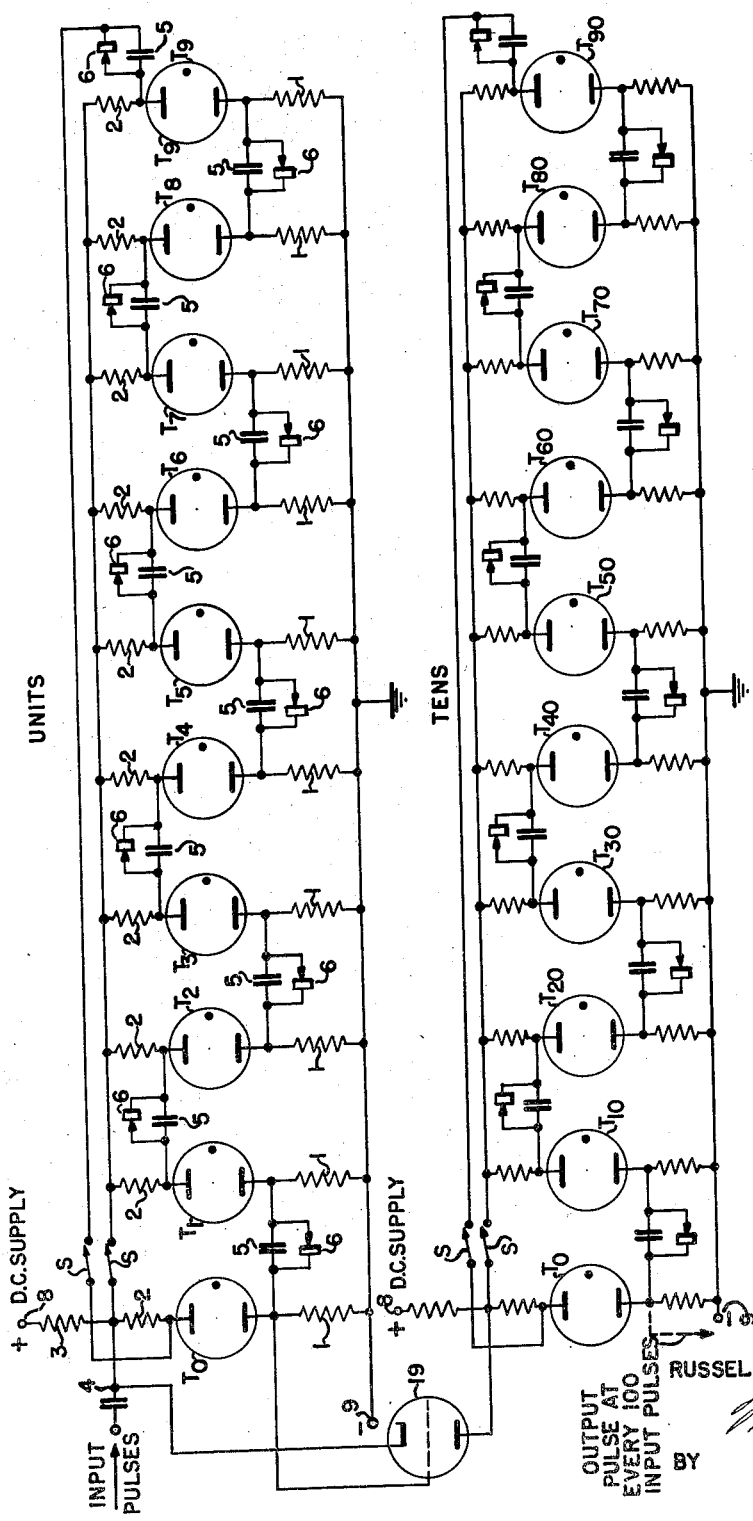
Fig. 1 is the circuit diagram of the invention arranged as a two strip decade counter.

Referring to Fig. 1, a two strip decade counter is shown, although there is no limit on the number of strips which may be connected in cascade. Counting is accomplished by the shifting of the position in the strip of the conducting tube. Each time a pulse is applied to the counter, the tube which is "on" at the time is extinguished, and the next tube in sequence ignites. As can be seen, tube $T_9$ is coupled back to tube $T_0$ in the same manner as the other tubes are coupled, so that the strip is actually a closed ring which completes a counting cycle every ten pulses. The "units" strip is coupled to the "tens" strip by an electron tube circuit 19 such that a pulse is applied to the input of the "tens" strip only when the "0" tube of the "units" strip conducts. However, the coupling may be done by any method which adapts itself to the characteristics of the particular glow discharge tube employed.

The anode of each cold cathode glow discharge diode is connected in series with an anode resistor 2 to an input bus 4 and through a common load resistor 3 to the positive terminal 8 of the direct current power source. The cathode of each glow discharge diode is connected in series with a cathode resistor 1 to ground and the negative terminal 9 of the direct current power source. The coupling from unit to unit is alternately from cathode to cathode and from anode to anode by means of capacitors 5. Each coupling capacitor 5 is shunted by a rectifier 6, which preferably is of the crystal type to avoid heater circuits, to provide directional characteristics in establishing a voltage distribution permitting the glow discharge tubes to become conducting in proper sequence, as will be described below.

Figure 2A:
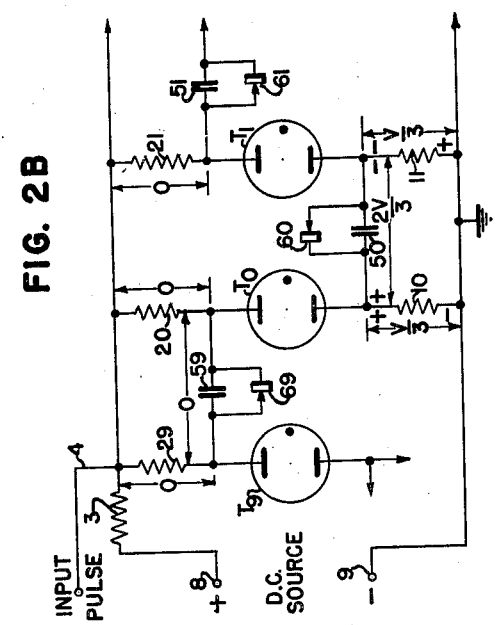
Fig. 2a illustrates the voltage distribution in a section of the counter of Fig. 1 when "0" unit is conducting.

As previously mentioned, cold cathode glow discharge tubes begin to conduct appreciable amounts of current at a critical potential known as the "breakdown" potential where ionization of the gas occurs. If there is a current limiting resistor in the circuit, the glow discharge takes place at a substantially lower potential across the tube which is called the "running voltage." With reference to Fig. 2a, assuming that one tube $T_0$ has been ignited, by adjustment of the value of circuit resistance or the potential of the direct current source, the voltage applied to the tubes is given a value slightly below the "breakdown" potential of the glow tubes. No other tube will ignite, and the circuit will become stable at the voltage distribution indicated in Fig. 2a, where the voltage V is the difference between the voltage applied to the counter strip from the direct current source and the "running voltage" e of the conducting tube $T_0$.

As will be noted, the rectifier 69 is connected to conduct and to place the anode resistor of tube $T_9$ in parallel with the anode resistor of the tube $T_0$, whereas the rectifier 60 is connected to be non-conducting thereby permitting capacitor 50 to charge to the potential of the voltage drop across cathode resistor 10. Tube $T_1$, being non-conducting, causes no current flow through resistor 11, consequently the only current flow through resistor 11 is the charging current of capacitor 50 and, in the stable state, there is zero voltage drop across resistor 11.

Figure 2B:
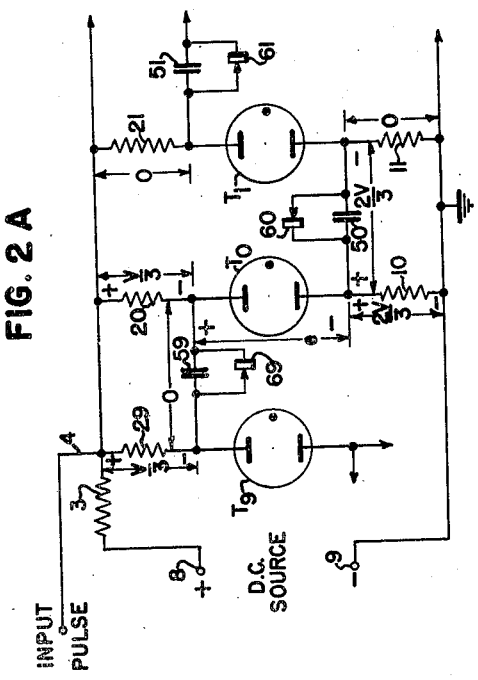
Fig. 2b illustrates the voltage distribution as the counting tube shifts from the "0" unit to the "1" unit.

Assume now that the voltage drop across input bus 4 and ground is abruptly lowered by a negative pulse applied to bus 4 so that the voltage across tube $T_0$ is less than its extinction potential and tube $T_0$ extinguishes. At this instant the voltage distribution in the circuit with none of the tubes conducting will be as indicated in Fig. 2b. The voltage across capacitor 50 will decay exponentially as it discharges through resistors 10 and 11, but if the negative pulse ends before these voltages have changed appreciably, it is readily apparent that the voltage across tube $T_1$ will be greater by substantially V/3 than the voltage across any other tube as the voltage applied to the input bus 4 rises. Therefore, tube $T_1$ will be the first to ignite and by its conduction prevent the voltage at the input bus 4 from rising to the "breakdown" potential of any other tube. It will also be seen that the voltage across tube $T_0$, which has just been extinguished, is lower by substantially V/3 than the voltage across any other tube thereby lowering the tendency of $T_0$ to ignite as the voltage rises on input bus 4.

Figure 2C:
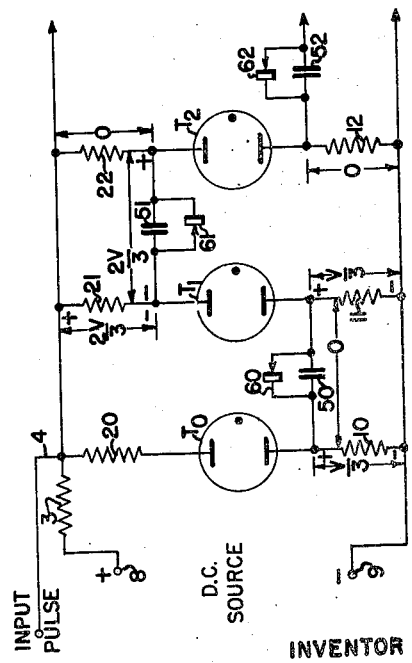
Fig. 2c illustrates the voltage distribution when the "1" unit is conducting.

After the circuit adjusts itself to the new steady state the voltage distribution will become that shown in Fig. 2c.

It will be noted that, with tube $T_1$ conducting, rectifier 50 is connected to be conducting and cathode resistor 10 is connected in parallel with cathode resistor 11, whereas rectifier 61 is connected to be non-conducting thereby permitting capacitor 51 to charge to the voltage drop 2V/3 across anode resistor 21. Tube $T_2$, being non-conducting, causes no current flow through resistor 22. It will be observed that, when the voltage on input bus 4 is lowered by the next incoming negative pulse, tube $T_1$ is extinguished and the voltage distribution of the charge on capacitor 51, analagous to that of Fig. 2b, will permit tube $T_2$ and only tube $T_2$ to ignite as the voltage on input bus 4 rises following the termination of the input pulse.

Figure 3:
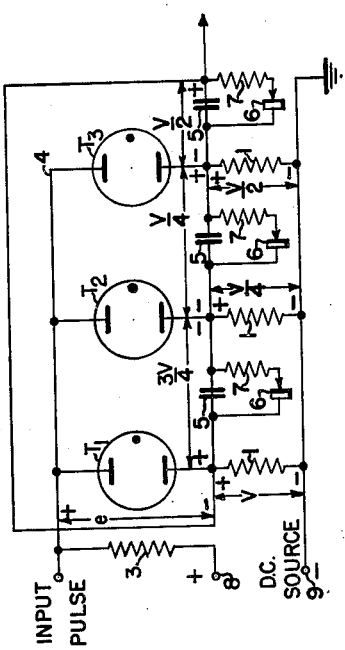
Fig. 3 is a diagram of a modified circuit in a ring of three units.

Fig. 3 shows a diagram of a modified circuit of the invention applied to a counting ring of three units. In this modification the anodes of the glow discharge diodes are connected directly to a common input bus 4. The cathodes are connected to ground through cathode resistors 1. Coupling from one unit to the next is made by capacitors 5 connected from cathode to cathode. Each coupling capacitor is shunted by a resistor 7 and a retifier 6 connected in series, provided to give directional characteristics to the counting sequence. The direct current power source is connected through a current limiting resistor 3 to the input bus 4 and to ground.

As in the circuit of Fig. 1, assuming that one of the glow discharge tubes is conducting, for example, tube $T_1$ the voltage applied to the input bus 4 is adjusted by varying the value of resistor 3 or the potential of the direct current power source to be a little lower than the "breakdown" voltage of the glow discharge tubes. After a time interval depending upon the values of resistors and capacitors, the circuit will reach a steady state with the voltage distribution as indicated in Fig. 3.

Assuming now that a negative pulse is applied to the input bus 4, the voltage across tube $T_1$ drops below the extinction potential and the tube $T_1$ ceases to conduct. As soon as this occurs, the voltages on the capacitors will begin to decrease exponentially, but if the voltage of the input bus 4 is allowed to rise by termination of the input pulse before the charges on the capacitors have changed appreciably, it is evident that the cathode of $T_2$ is the most negative point in the network and that tube $T_2$ will be the first tube to reach its breakdown potential. As soon as tube $T_2$ becomes conducting, the voltage applied to the input bus 4 is held below the breakdown voltage and no other tube can conduct.

This cycle is repeated for each input pulse and the tubes will conduct in the sequence 1, 2, 3, 1, 2, 3, etc. Since the tubes give off visual light while conducting, the position of the conducting tube and hence the number of pulses counted are readily observed. In a cascade counter circuit, a number of these connecting rings may be coupled so that each time a given unit of the first counting ring ignites, it causes the second counting ring to be pulsed, and so forth.

Since glow discharge tubes require a finite time to ionize or "breakdown" and also a finite time to de-ionize after extinction, a definite limitation is placed on the maximum frequency of operation. The particular tube construction, gas pressure, temperature, current previous to extinction, and applied voltage are among the factors which act to influence the de-ionization time of a given flow discharge tube. Therefore, the values of resistances and capacitances used in the circuit will depend upon the type tube used and may be varied for different applications. In general, all of the resistances can be the same value except for the load resistance 3, which is also dependent on the potential of the direct current power source and the method of applying the incoming pulses. It is evident that the pulse time duration must allow de-ionization to occur and for some types of tubes it may be necessary to limit the voltage to which the input bus 4 can rise when all the tubes are momentarily extinguished in order to avoid multiple ignition of "quick firing" tubes.

In most applications, it is required to be able to "zero" the counter before starting to count, that is, to bring all of the strips to the condition that the "zero" tube is conducting. This can be done by momentarily opening switches S which disconnect all tubes except the "zero" tube from the power source.

While several embodiments of the invention have been disclosed and described, it is to be understood that other modifications and changes may be made in this invention without departing from the spirit and scope thereof as set forth in the appended claims.

The invention described herein may be manufactured and used by or for the Government of the United States of America for government purposes without the payment of any royalty thereon or therefor.

What is claimed is:

1. An electronic counter for counting electric pulses comprising a plurality of gaseous discharge tubes, means including a direct current power source for energizing said tubes, means for applying said pulses to said tubes in common, and rectifier shunted capacitor coupling means connecting said tubes into an endless operating ring, whereby conduction of one of said tubes charges only the capacitor coupling to the next tube in sequence.

2. In an electronic counter for counting electric pulses, a plurality of two or more gaseous discharge tubes, means capacitatively coupling said tubes in an endless operative ring, rectifying means shunting said coupling means so that the conduction of one tube will prepare only the next tube in sequence to become conducting, and means common to said tubes and to which they are conductively coupled for applying said pulses to said ring to extinguish the then conducting tube.

3. In an electronic counter for counting electric pulses, a plurality of gaseous discharge tubes, a direct current power source for energizing said tubes, means capacitatively coupling said tubes into an endless operative ring, rectifying means shunting said coupling means, whereby conduction of one of said tubes charges only the coupling means to the next tube in sequence, and means common to said tubes and to which they are conductively coupled for applying said pulses to said ring.

4. An electronic counter for counting electric pulses comprising a plurality of gaseous discharge diodes, means including a direct current power source for energizing said diodes, means for applying said pulses to said diodes in common, and rectifier shunted capacitor coupling means connecting said diodes into an endless operating ring whereby conduction of one of said diodes charges only the capacitor coupling to the next diode in sequence.

5. In an electronic counter for counting electrical pulses, a plurality of two or more gaseous discharge diodes, means capacitatively coupling said diodes in an endless operative ring, rectifying means shunting said coupling means so that the conduction of one diode will prepare only the next diode in sequence to become conducting, and means common to said diodes and to which they are conductively coupled for applying said pulses to said ring to extinguish the then conducting diode.

6. In an electronic counter for counting electric pulses, a plurality of gaseous discharge diodes, a direct current source for energizing said diodes, means capacitatively coupling said diodes into an endless operative ring, rectifying means shunting said coupling means, whereby conduction of one of said diodes charges only the coupling means to the next diode in sequence, and means common to said diodes and to which they are conductively coupled for applying said pulses to said ring.

7. A sequence operated ring type electronic counter circuit for counting electric pulses comprising, a plurality of glow discharge tubes having anode and cathode electrodes, a direct current power source including a current limiting resistor, resistance coupling means connecting each anode and each cathode to the positive and negative terminals respectively of said source, a plurality of rectifier shunted capacitor coupling similarly polarized electrodes of adjacent tubes into an endless operating ring, and means for applying said pulses to said ring whereby the then conducting tube is extinguished.

8. A sequence operated ring type electronic counter circuit for counting electric pulses comprising, a plurality of glow discharge tubes having anode and cathode electrodes, a direct current source for energizing said tubes, resistance coupling means connecting said anode and each cathode to the positive and negative terminals respectively of said source, said source including means to adjust the voltage applied to said tubes below the breakdown voltage of said tubes while one of said tubes is conducting, rectifier shunted capacitors coupling similarly polarized electrodes of adjacent tubes into an endless ring, and means for applying said pulses to said ring whereby the then conducting tube is extinguished.

9. A sequence operated ring type electronic counter circuit for counting electric pulses comprising, a plurality of glow discharge tubes having anode and cathode electrodes, a direct current power source including a current limiting resistor, means including resistance elements for coupling each of said tubes to said source, a plurality of rectifier shunted capacitors coupling alternately the cathodes of two adjacent tubes and the anodes of the next two tubes to form an endless counting ring, and means for applying said pulses to said ring.

10. A sequence operated ring type electronic counter circuit for counting electric pulses comprising, a plurality of glow discharge tubes having anode and cathode electrodes, a direct current power source for energizing said tubes, resistance coupling means for connecting said anodes and said cathodes to the positive and negative terminals respectively of said source, said source including means to adjust the voltage applied to said tubes below the breakdown voltage of said tubes when one of said tubes is conducting, a plurality of rectifier shunted capacitors coupling alternately the cathodes of two adjacent tubes and the anodes of the next two to form an endless counting ring whereby conduction of one of said tubes charges only the capacitor coupling the next tube in sequence to prepare said next tube for conduction, and means for applying said pulses to said tubes in common to extinguish whichever tube is conducting.

11. A counting system for counting electrical input pulses comprising, a series of electronic circuits; each of said circuits including a plurality of gaseous discharge tubes having anode and cathode electrodes, means capacitatively coupling similarly polarized electrodes of the tubes into an endless counting ring, rectifying means shunting said coupling means so that the conduction of one tube in said ring charges only the capacitor coupling the next tube in sequence to prepare said next tube for conduction, means common to said tubes and to which they are conductively coupled for applying said input pulses to said ring to extinguish the then conducting tube; a source of direct current power for energizing each of said circuits, and means to couple each of said counting rings into a series such that the pulse completing the counting cycle for one ring is thereby applied to actuate the next ring in the series.

12. A counting system for counting electrical input pulses comprising a series of sequence operated ring type electronic counter circuits, a source of direct current power for energizing said circuits, means to couple each of said counter circuits into a series such that the input pulse completing the counting cycle for one of said rings is thereby applied to actuate the next ring in said series, each of said circuits including a plurality of gaseous discharge tubes having anode and cathode electrodes, resistance coupling means for connecting said anodes and said cathodes to the positive and negative terminals of said source, said source including means to adjust the voltage applied to said tubes below the breakdown voltage of said tubes when one of said tubes conducts, a plurality of rectifier shunted capacitors coupling alternately the cathodes of two adjacent tubes and the anodes of the next two to form an endless counting ring, whereby conducting of one of said tubes charges only the capacitor coupling the next tube in sequence to prepare said next tube for conduction, and means for applying said input pulses to said tubes in common to extinguish whichever tube is conducting.

13. Apparatus for counting electrical pulses comprising, a plurality of gaseous discharge tubes, means including a direct current power source for energizing said tubes, energy storage means coupling said tubes into an endless ring, means for applying said pulses to be counted to said ring, and rectifying means shunting said energy storage means to provide predetermined unidirectional energy storage.

14. Apparatus for counting electrical pulses comprising, a plurality of gaseous discharge tubes having anode and cathode electrodes, means including a direct current power source for energizing said tubes, energy storage means coupling similarly polarized electrodes to said tubes into an endless ring, means for applying said pulses to be counted to said ring, and rectifying means shunting said energy storage means to provide energy storage solely in a predetermined direction.

15. An electronic counter for electrical pulses comprising, a source of direct current power, a plurality of gaseous discharge tubes, means for energizing said tubes from said source, means to adjust the potential of said source below the breakdown potential of said tubes while one of said tubes is conducting, energy storage means coupling each of said tubes to another to form an endless ring, a rectifier shunting each of said energy storage means to provide polarity of energy storage, and means for applying pulses to be counted to said ring.

16. An electronic counter for electrical pulses comprising, a source of direct current power, a plurality of gaseous discharge tubes, means for energizing said tubes independently from said source, current limiting means to limit the potential of said source between the breakdown and extinction potentials of said tubes while one of said tubes is conducting, means for capacitively coupling each of said tubes to another to form an endless ring, a rectifier shunting each of said coupling means to provide polarity of energy storage, and means for applying pulses to be counted to said ring.

17. An electronic counter for electrical pulses comprising, a source of direct current power, a plurality of gaseous discharge tubes having anode and cathode electrodes, resistance coupling means conductively connecting each anode and each cathode to the positive and negative terminals respectively of said source, current limiting means to limit the potential of said source between the breakdown and extinction potentials of said tubes while one of said tubes is conducting, means for capacitively coupling similarly polarized electrodes of each of said tubes to another to form an endless ring, means for applying pules to be counted to said ring, and a rectifier shunting each of said coupling means to establish polarity of energy storage, whereby successive pulses act to extinguish the then conducting tube and the energy stored in said coupling means acts with the potential of said source on termination of said pulses to exceed the breakdown potential for the next tube in said ring and shift conduction to successive tubes of said ring.

18. A counting system for counting electrical input pulses comprising, a cascade connected series of sequence operated ring type electronic counter circuits, a source of direct current power for energizing said circuits, means to couple each of said counter circuits into a cascaded series such that the input pulse completing the counting cycle for one of said rings is thereby applied to actuate the next ring in said series, each of said circuits including a plurality of gaseous discharge tubes having anode and cathode electrodes, resistance coupling means for connecting said anodes and said cathodes to the positive and negative terminals respectively of said source, said source including current limiting means to limit the potential of said source between breakdown and extinction potentials of said tubes when one of said tubes conducts, energy storage means capacitively coupling similarly polarized electrodes of each of said tubes to another to form an endless ring, a rectifier shunting each of said coupling means to provide polarity of energy storage, and means for applying pulses to be counted to the first ring of said cascade connected series.

RUSSELL SYDNOR CRENSHAW, JR.

No references cited.